United States Patent
Saito et al.

(10) Patent No.: US 10,839,265 B2
(45) Date of Patent: Nov. 17, 2020

(54) PLATFORM FOR PREVENTING ADVERSARIAL ATTACKS ON IMAGE-BASED MACHINE LEARNING MODELS

(71) Applicant: SAP SE, Walldorf (DE)

(72) Inventors: Sean Saito, Singapore (SG); Sujoy Roy, Singapore (SG)

(73) Assignee: SAP SE, Walldorf (DE)

( * ) Notice: Subject to any disclaimer, the term of this patent is extended or adjusted under 35 U.S.C. 154(b) by 267 days.

(21) Appl. No.: 16/186,784

(22) Filed: Nov. 12, 2018

(65) Prior Publication Data
US 2020/0151505 A1    May 14, 2020

(51) Int. Cl.
*G06K 9/62* (2006.01)
*G06K 9/40* (2006.01)

(52) U.S. Cl.
CPC ............ *G06K 9/6256* (2013.01); *G06K 9/40* (2013.01)

(58) Field of Classification Search
None
See application file for complete search history.

(56) References Cited

U.S. PATENT DOCUMENTS

| | | | |
|---|---|---|---|
| 2019/0138860 A1* | 5/2019 | Liu | G06K 9/66 |
| 2019/0295227 A1* | 9/2019 | Wang | G06K 9/4628 |
| 2019/0323452 A1* | 10/2019 | Wells | F02K 1/40 |
| 2020/0104635 A1* | 4/2020 | Xu | G06K 9/6256 |

* cited by examiner

*Primary Examiner* — David Perlman
(74) *Attorney, Agent, or Firm* — Fish & Richardson P.C.

(57) ABSTRACT

Methods, systems, and computer-readable storage media for receiving a set of training images and a set of classification labels, generating a set of target codebooks based on the set of classification labels, the set of target codebooks being provided as a first set of vectors of random value and dimension, generating a set of output codebooks based on the set of training images, the set of output codebooks being provided as a second set of vectors of random value and dimension, training a ML model by minimizing a loss function provided as a mean-squared-error (MSE) loss function, the loss function being measured by the Euclidean distance between an output codebook of the set of output codebooks and a target codebook of the set of target codebooks.

20 Claims, 5 Drawing Sheets

PLATFORM FOR PREVENTING ADVERSARIAL ATTACKS ON IMAGE-BASED MACHINE LEARNING MODELS

BACKGROUND

Image-based machine learning (ML) models can be used to identify and classify images. For example, a user can submit an image to an image-based ML model for classification of the image, or of one or more objects depicted in the image. Image-based ML models are currently used in a variety of applications, such as image-based security credential verification, and reverse image searching.

While image-based ML models can serve as powerful tools in a variety of applications, they are also susceptible to adversarial attacks. Attackers can subvert an image-based ML model by presenting the model with an image that contains small amounts of adversarial noise (an adversarial example). Adding adversarial noise to an image presented to an image-based ML model can cause the model to provide an incorrect classification. Additionally, the classification labels used to train image-based ML models are often provided as binary vectors. These binary vector-type classification labels are easy to predict, which enables attackers to easily predict and alter the classification labels to force the ML model to generate erroneous classifications for images provided to the model.

As image-based ML models become increasingly relied upon for image classification in a variety of settings (e.g., facial recognition), there exists a growing need for improved defenses against adversarial attacks of image-based ML models.

SUMMARY

Implementations of the present disclosure are directed to mitigation of adversarial attacks on image classification systems. More particularly, implementations of the present disclosure are directed to an adversarial attack defense (AAD) platform that leverages codebooks, machine-learning (ML) training, and filtering in order to mitigate adversarial attacks on image-based ML models.

In some implementations, actions include receiving a set of training images and a set of classification labels, each training image in the set of training images being associated with one or more classification labels in the set of classification labels, generating a set of target codebooks based on the set of classification labels, each target codebook in the set of target codebooks being specific to a classification label in the set of classification labels, the set of target codebooks being provided as a first set of vectors of random value and dimension, generating a set of output codebooks based on the set of training images, each output codebook in the set of output codebooks being specific to a class of a set of classes, the set of output codebooks being provided as a second set of vectors of random value and dimension, training a ML model by minimizing a loss function provided as a mean-squared-error (MSE) loss function, the loss function being measured by the Euclidean distance between an output codebook of the set of output codebooks and a target codebook of the set of target codebooks, the target codebook being specific to a classification label of the set of classification labels associated with the training image of the set of training images used to generate the output codebook of the set of output codebooks. Other implementations of this aspect include corresponding systems, apparatus, and computer programs, configured to perform the actions of the methods, encoded on computer storage devices.

These and other implementations can each optionally include one or more of the following features: receiving an input image, modifying the input image to provide a modified image, the modified image having less noise than the input image, generating a first output codebook for the input image by processing the modified image using the trained ML model, the first output codebook being a vector of random value and dimension, determining a target codebook of the set of target codebooks the smallest Euclidean distance from the first output codebook, and generating a classification for the input image, the classification being a classification label of the set of classification labels specific to the target codebook of the set of target codebooks the smallest Euclidean distance from the first output codebook; modifying the input image includes processing the input image using an autoencoder; modifying the input image includes applying a series of non-linear transformations to the input image to reconstruct the input image without adversarial noise; the set of classification labels is provided as a set of binary vectors; generating a set of target codebooks includes applying a deterministic pattern to the set of classification labels to generate the first set of vectors; and the dimensions of the vectors of the second set of vectors are the same as the dimensions of the vectors of the first set of vectors.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Implementations of the present disclosure are directed to mitigation of adversarial attacks on image classification systems. More particularly, implementations of the present disclosure are directed to an adversarial attack defense (AAD) platform that leverages codebooks, machine-learning (ML) training, and filtering in order to prevent adversarial attacks on image-based ML models. Implementations can include actions of receiving a set of training images and a set of classification labels, each training image in the set of training images being associated with one or more classification labels in the set of classification labels, generating a set of target codebooks based on the set of classification labels, each target codebook in the set of target codebooks being specific to a classification label in the set of classification labels, the set of target codebooks being provided as a first set of vectors of random value and dimension, generating a set of output codebooks based on the set of training images, each output codebook in the set of output codebooks being specific to a class of a set of classes, the set of output codebooks being provided as a second set of vectors of random value and dimension, training a ML model by minimizing a loss function provided as a mean-squared-error (MSE) loss function, the loss function being measured by the Euclidean distance between an output codebook of the set of output codebooks and a target codebook of the set of target codebooks, the target codebook being specific to a classification label of the set of classification labels associated with the training image of the set of training images used to generate the output codebook of the set of output codebooks.

As introduced above, implementations of the present disclosure are directed to mitigation of adversarial attack on image-based ML models using an ML-based AAD platform. Defending against adversarial attacks on image-based ML models is useful in numerous applications. Example applications of image-based ML models include, without limitation, mobile check depositing, facial recognition-based security systems, and reverse image searching. In some examples, ML-based analysis of an image is conducted to determine certain information about the image. For example, ML-based analysis of an image of a check can be conducted to determine the amount, check number, and routing number of the check in the image. In another example, ML-based analysis of an image of a human face can be conducted to determine whether the features of the face in the image match the features of a face that serves as a security credential. Accuracy of image-based ML models is critical in ensuring secure and accurate transactions involving ML-based image analysis.

ML models, including image-based ML models, are susceptible to adversarial attacks. For example, image-based ML models can be attacked by presenting the ML model with an image containing a small amount of adversarial noise (an adversarial example). Presenting an image-based ML model with an adversarial example results in the ML model incorrectly interpreting and classifying the contents of the image. Adversarial attacks on image-based ML models can either be targeted or untargeted. In an untargeted attack, the attacker presents the ML model with an adversarial example designed to force the model to provide any classification for the image other than the classification that a human would provide for the image. For example, an attacker may add adversarial noise to an image of a cat and present the modified image to a ML model in an attempt to force the ML model to classify the image as anything other than "cat." In contrast, in a targeted attack, the attacker presents the ML model with an adversarial example designed to force the model to provide a specific classification for the image that is contrary to the classification a human would provide for the image. For example, an attacker may add adversarial noise to an image of a car and present the modified image to a ML model in an attempt to force the ML model to specifically classify the image as "airplane." Targeted attacks are especially powerful, as they can be used to subvert image-based ML models to provide specific desired classifications for an image that are contrary to the image's true classification. For example, in a targeted attack on an image-based ML model for mobile check depositing, an attacker can add adversarial noise to an image of a check in order to force the ML model to misclassify the routing number or the value of the check as a different routing number or a different value.

Currently, most ML models used for image classification are trained by minimizing a cross-entropy loss function. The classification labels used for training a ML model using cross-entropy loss are represented as binary vectors (target vectors), and the length of the target vectors is determined based on the number of classification labels in the classification system. For example, if the classification system includes 10 classification labels, the target vectors for training the ML model will have a length of 10.

Many adversarial attacks on ML models rely on the attacker either knowing the value and dimension of the target vectors (white box attack), or being able to predict the value and dimension of the target vectors (black box attack). Due to their binary nature, the value and dimension of the target vectors of ML models trained using cross-entropy loss are highly predictable. For this reason, attackers can easily attack ML models trained using cross-entropy loss, because the training vectors of such ML models can be easily predicted.

In view of the above context, implementations of the present disclosure are directed to an AAD platform that leverages codebooks, ML training, and filtering in order to defend against adversarial attacks on image-based ML models.

Figure 1:
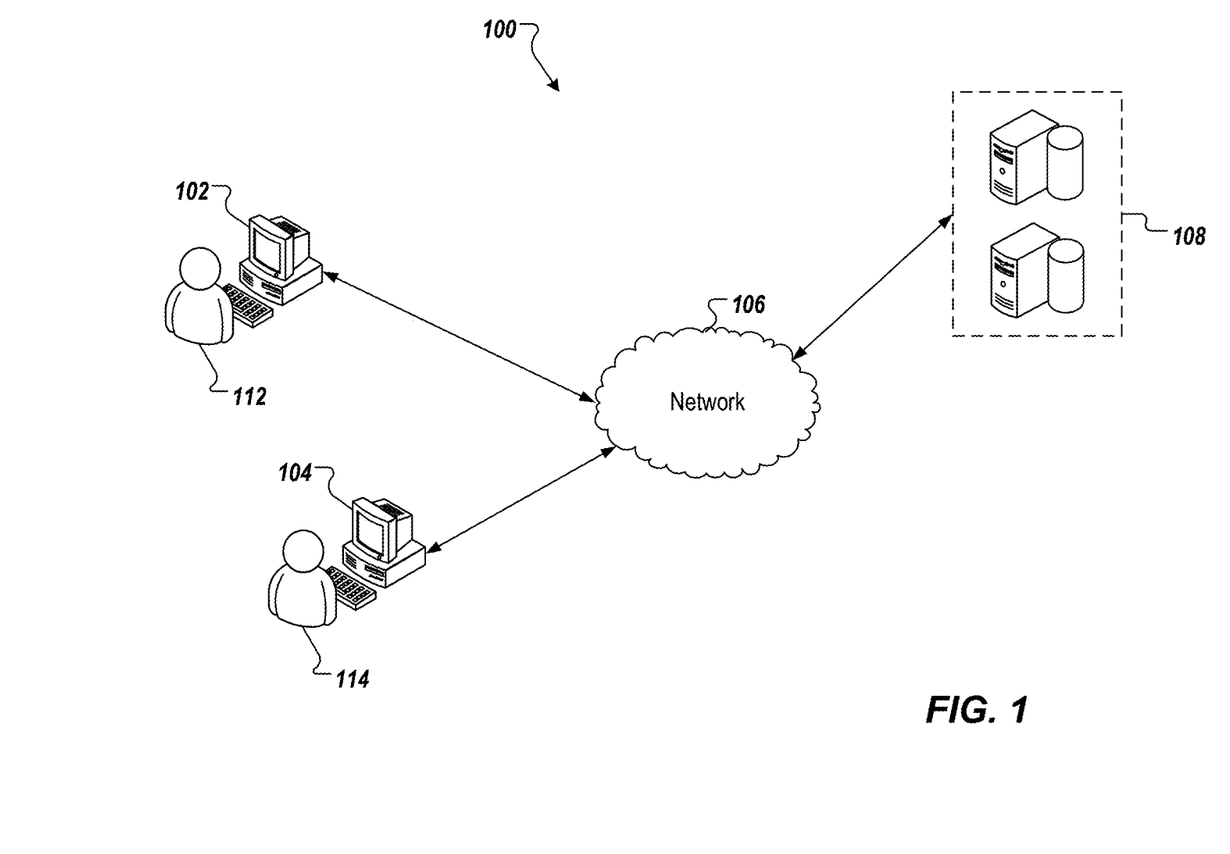
FIGS. 1 and 2 depict example architectures that can be used to execute implementations of the present disclosure.

FIG. 1 depicts an example architecture 100 in accordance with implementations of the present disclosure. In the depicted example, the example architecture 100 includes one or more client devices 102, 104, a network 106, and a server system 108. The server system 108 includes one or more server devices and databases (e.g., processors, memory). In the depicted example, respective users 112, 114 interact with the client devices 102, 104. In an example context, the users 112, 114 can include a user who submits images for classification to an image-based ML model that is hosted by the server system 108.

In some examples, the client devices 102, 104 can communicate with the server system 108 over the network 106. In some examples, the client devices 102, 104 can include any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices.

In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, the server system 108 includes at least one server and at least one data store. In the example of FIG. 1, the server system 108 is intended to represent various forms of servers including, but not limited to a web server, an application server, a proxy server, a network server, and/or a server pool. In general, server systems accept requests for application services and provides such services to any number of client devices (e.g., the client devices 102, 104 over the network 106).

In accordance with implementations of the present disclosure, and as noted above, the server system 108 can host an AAD platform (e.g., provided as one or more computer-executable programs executed by one or more computing devices). For example, the user 112 can provide an image to a facial recognition system that implements an AAD platform hosted on the server system 108 to obtain classification of the image (e.g., an image of the face of the user 112 is provided as part of a facial recognition process). As another example, the user 114 can provide an adversarial image to the facial recognition platform in an effort to spoof the image of the user 112.

As introduced above, and described in further detail herein, implementations of the present disclosure provide an AAD platform for defense against adversarial attacks on ML models. In some implementations, the AAD platform includes a ML model trained to classify images using mean-squared error and target codebooks. In some implementations, the AAD platform includes a smoothing filter for detection and removal of adversarial noise from images received by the platform.

Figure 2:
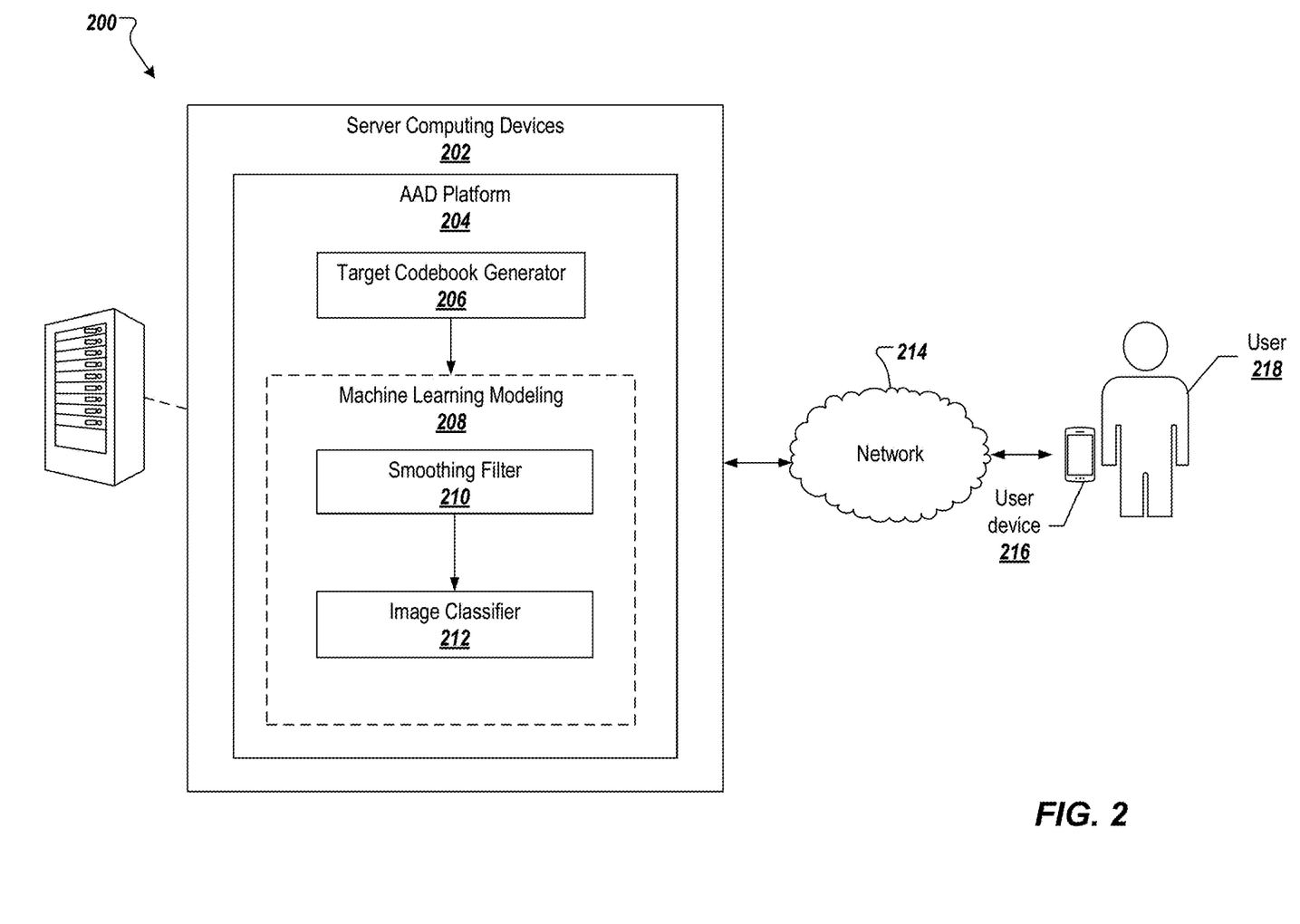

FIG. 2 depicts an example architecture 200 in accordance with implementations of the present disclosure. In the depicted example, the example architecture 200 includes a user device 216, a network 214, and a server system 202. The server system 202 includes one or more server devices and databases (e.g., processors, memory). In the depicted example, user 218 interacts with the user device 216. In an example context, the user interacts with an AAD platform 204 hosted by the server 202 to classify images. In some implementations, the AAD platform 204 is in image classification platform that provides functionality for adversarial attack defense in accordance with implementations of the present disclosure.

In some examples, the user device 216 communicates with the server system 202 over the network 214. In some examples, the user device 216 can include any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices.

In some implementations, the network 214 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, the server system 202 includes at least one server and at least one data store. In the example of FIG. 2, the server system 202 is intended to represent various forms of servers including, but not limited to a web server, an application server, a proxy server, a network server, and/or a server pool. In general, server systems accept requests for application services and provides such services to any number of user devices (e.g., the user device 216 over the network 214).

In accordance with implementations of the present disclosure, and as noted above, the server system 202 can host an AAD platform 204. In the depicted example, the AAD platform 204 includes a target codebook generator 206, and a ML modeling module 208. In some implementations, the ML modeling module 208 includes a smoothing filter 210 and an image classifier 212. As described in further detail herein, the image classifier 212 can be trained using codebooks generated by the target codebook generator 206. As also described in further detail herein, images received by the AAD platform 204 can be processed by the smoothing filter 210 to detect and remove adversarial noise contained within the images prior to classification of the images by the image classifier 212.

In some implementations, the AAD platform 204 receives a set of training images and a set of classification labels. In some implementations, the set of training images and the set of classification labels are provided to the AAD platform 204 by a user 218 over the network 214. For example, a software developer can provide the AAD platform 204 with a set of training images and a set of classification labels for training a ML model of the AAD platform (e.g., image classifier 212). In some implementations, each training image in the set of training images is associated with one or more classification labels. For example, a training image of a cat playing with a toy ball can be associated with a "cat" classification label and a "ball" classification label. In some examples, the set of classification labels is provided to the AAD platform 204 as a set of binary vectors, each binary vector in the set of binary vectors being specific to a classification label of the set of classification labels.

In some implementations, the target codebook generator 206 generates a set of target codebooks based on the set of classification labels provided to the AAD platform 204. In some implementations, each target codebook in the set of target codebooks generated by the target codebook generator 206 is specific to a classification label of the set of classification labels received by the AAD platform 204.

In some implementations, the target codebook generator 206 generates the set of target codebooks by applying a deterministic pattern to the set of classification labels received by the AAD platform 204, such that each target codebook in the set of target codebooks is deterministically related to a classification label of the set of classification labels. For example, if 10 classification labels are received by the AAD platform 204, the target codebook generator 206 will apply a deterministic pattern to transform the 10 classification labels into 10 unique target codebooks, each target codebook being specific to a classification label of the set of 10 classification labels. In some implementations, each training image in the set of training images received by the AAD platform 204 is associated with one or more target codebooks of the set of target codebooks generated by the target codebook generator 206.

In some implementations, each codebook in the set of target codebooks generated by the target codebook generator 206 is provided as a vector. In some examples, the vectors of the set of target codebooks are provided as vectors of random value and dimension. In some examples, the vectors of the set of target codebooks are of random value ranging between −1 and 1. In some implementations, the lengths of the target codebooks are random. In some implementations, the target codebooks are provided in a Euclidean space of random dimension. In some implementations, each target codebook in the set of target codebooks generated by the target codebook vector 206 is provided as a single point in a Euclidean space of random dimension.

In accordance with implementations of the present disclosure, and as introduced above, the AAD platform includes a ML modeling module 208. In the example of FIG. 2, the ML modeling module 208 includes a smoothing filter 210 and an image classifier 212.

In accordance with implementations of the present disclosure, the image classifier 212 uses ML techniques to provide classification predictions for images received by the image classifier 212 based on the content of the images. In some implementations, images are provided to the image classifier 212 by a user 218 over the network 214. In some implementations, the image classifier 212 receives images from the smoothing filter 210 of the ML modeling module 208. In some examples, the image classifier 212 identifies and classifies objects contained within an image. For example, the image classifier 212 can be trained to identify the routing number contained within an image of a check. In some examples, the image classifier 212 can be trained to identify facial features (e.g., eyes, nose) in an image of a human face. In some implementations, the image classifier 212 is provided as a neural network.

In some implementations, the image classifier 212 provides a classification for an image by generating an output codebook based on the image, and measuring the Euclidean distance between the output codebook and each target codebook in a set of target codebooks generated by the target codebook generator 206. In some implementations, the image classifier 212 generates an output codebook for an image class by applying ML techniques to process the image. In some implementations, the image classifier 212 generates an output codebook for an image class based on a predicted classification for the image determined by applying ML techniques to the image. In some examples, the output codebook generated by the image classifier 212 for a first image is identical to the output codebook generated by the image classifier 212 for a second image having the same predicted classification as the first image. For example, the codebook for the first image classified as dog, is the same as the codebook for the second image also classified as dog. In some implementations, the output codebooks generated by the image classifier 212 are provided as vectors. In some examples, the output codebooks generated by the image classifier are provided as vectors of random value and dimension. In some implementations, the output codebooks generated by the image classifier 212 are provided as vectors with a random value ranging between −1 and 1. In some implementations, the output codebooks generated by the image classifier 212 are provided in a Euclidean space of random dimensions. In some implementations, the output codebooks generated by the image classifier 212 are provided as single points in a Euclidean space. In some implementations, the dimensions of the output codebooks generated by the image classifier 212 are the same as the dimensions of the target codebooks generated by the target codebook generator 206. In some implementations, output codebooks generated by the image classifier 212 are provided in the same Euclidean space as the set of target codebooks generated by the target codebook generator 206.

In some examples, the image classifier 212 classifies an image by determining the target codebook of the set of target codebooks generated by the target codebook generator 206 that is the smallest Euclidean distance away from the output codebook generated by the image classifier 212 for the image. For example, the image classifier 212 can measure the Euclidean distance between an output codebook generated by the image classifier 212 for a particular image and each target codebook in the set of target codebooks generated by the target codebook generator 206, and determine the target codebook that is the smallest Euclidean distance away from the respective output codebook. In some implementations, the image classifier 212 generates a classification for an image by determining a classification label of the set of classification labels received by the AAD platform 204 that is specific to the target codebook of the set of target codebooks generated by the target codebook generator 206 that is the smallest Euclidean distance from the output codebook generated by the image classifier 212 for the image. For example, if the classification label specific to the target codebook of the set of target codebooks that is the smallest Euclidean distance from the output codebook generated by the image classifier 212 for an image is "house," the image classifier will provide "house" as the classification for the respective image.

In some implementations, image classifier 212 is trained to classify images using training images received by the AAD platform 204 and a set of target codebooks generated by the target codebook generator 206 based on a set of classification labels received by the AAD platform 204. In some implementations, the image classifier 212 generates the set of output codebooks by applying ML techniques to the set of training images to process the images. In some implementations, each output codebook of the set of output codebooks is generated by the image classifier 212 based on a predicted classification for each training image in the set of training images determined by applying ML techniques to each training image of the set of training images. In some implementations, the image classifier 212 is trained to classify images by minimizing a loss function. In some implementations, the loss function is provided as mean-squared error (MSE). In some implementations, MSE loss is defined by the Euclidean distance between an output codebook generated by the image classifier 212 based on a training image and a target codebook generated by the target codebook generator 206 and specific to the one or more classification label(s) associated with the respective training image. In some implementations, the image classifier is trained by generating an output codebook for each training image in the set of training images, and measuring the Euclidean distance between an output codebook of the set of output codebooks specific to a training image and the one or more target codebook(s) specific to the one or more classification labels associated with the respective training image. In some implementations, decreases in the Euclidean distance between the output codebook generated by the image classifier 212 for a training image and the target codebook(s) generated by the target codebook generator 206 for the classification label(s) associated with the training image indicate an improved accuracy of the image classifier 212 for classifying images.

In accordance with implementations of the present disclosure, the AAD platform 204 includes a smoothing filter 210. The smoothing filter 210 processes input images to detect and remove any adversarial noise contained within the images. In some implementations, the smoothing filter 210 is provided as a neural network. In some implementations, the smoothing filter 210 is provided as an autoencoder. In some implementations, the smoothing filter 210 uses ML techniques to detect the presence of adversarial noise in input images. In some implementations, the smoothing filter 210 is trained to detect adversarial noise in images by receiving a set of training images, each image in the set of training images containing adversarial noise. In some implementations, the smoothing filter 210 is trained by minimizing the Euclidean distance between an output codebook generated for an input image and an output codebook generated for a reconstruction of the input image having no adversarial noise. In some examples, input images are received by the AAD platform 204 and provided to the smoothing filter 210 prior to classification of the images by the image classifier 212.

In some implementations, the smoothing filter 210 removes adversarial noise detected in an input image by performing a series of transformations on the input image to provide a modified image. In some implementations, the modified image provided by the smoothing filter 210 is a reconstruction of the input image with any detected adversarial noise removed. In some examples, the series of transformations performed by the smoothing filter 210 on the input image are provided as a series of non-linear transformations. In some implementations, modified images generated by the smoothing filter 210 are provided to the image classifier 212 for classification.

Figure 3:
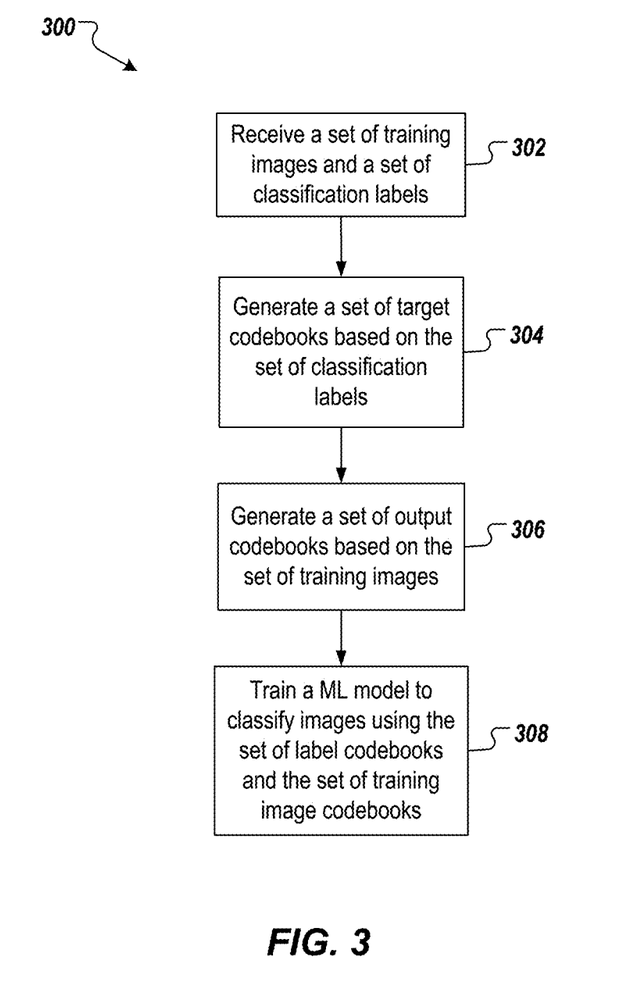
FIGS. 3 and 4 depict example processes that can be executed in accordance with implementations of the present disclosure.

FIG. 3 depicts an example process 300 that can be executed in accordance with implementations of the present disclosure. In some examples, the example process 300 is provided using one or more computer-executable programs executed by one or more computing devices. For example, the example process 300 can be executed by an AAD platform of the present disclosure.

A set of training images and a set of classification labels is received (302). For example, a set of training images and a set of classification labels can be provided by a developer of an image classification ML model. In some implementations, each training image in the set of training images is associated with one or more classification labels in the set of classification labels. In some implementations, the set of classification labels is provided as a set of binary vectors.

A set of target codebooks is generated based on the set of classification labels (304). In some implementations, each target codebook of the set of target codebooks is specific to a classification label of the set of classification labels. In some implementations, the set of target codebooks is generated by applying a deterministic pattern to the set of classification labels. In some implementations, each training image is associated with one or more target codebooks of the set of target codebooks. In some implementations, the set of target codebooks is provided as a set of vectors. In some implementations, the set of target codebooks is provided as a set of vectors of random value and dimension. In some implementations, the set of target codebooks is provided as a set of vectors of random value ranging between −1 and 1. In some implementations, the set of target codebooks is provided as a set of random points in a Euclidean space of random dimension.

A set of output codebooks is generated based on the set of training images (306). In some implementations, each output codebook in the set of output codebooks is specific to a training image of the set of training images. In some implementations, each output codebook in the set of output codebooks is generated by applying ML techniques to each training image of the set of training images. In some implementations, each output codebook of the set of output codebooks is generated by the image classifier 212 based on a predicted classification for each training image in the set of training images determined by applying ML techniques to each training image of the set of training images. In some implementations, the set of output codebooks is provided as a set of vectors. In some implementations, the set of output codebooks is provided as a set of vectors of random value and dimension. In some implementations, the set of output codebooks is provided as a set of vectors of random value ranging between −1 and 1. In some examples, the dimensions of the output codebooks are the same as the dimensions of the target codebooks. In some implementations, the set of output codebooks is provided in the same Euclidean space as the set of target codebooks.

A ML model (e.g., image classifier 212 of FIG. 2) is trained to classify images using the set of target codebooks and the set of output codebooks (308). In some examples, the ML model is trained to identify and classify objects contained within an image. In some implementations, the ML model is trained by minimizing a loss function. In some implementations, the ML model is trained by minimizing a MSE loss function. In some examples, the MSE loss function is determined by measuring the Euclidean distance between an output codebook of the set of output codes and a respective target codebook of the set of target codebooks. For example, the MSE loss function can be determined by measuring the Euclidean distance between the output codebook generated for a training image of the set of training images and a target codebook specific to a classification label associated with the respective training image. In some examples, a decrease in the Euclidean distance between the output codebooks for the training images and the respective target codebooks associated with the training images indicates improved accuracy of the ML model to classify images.

Figure 4:
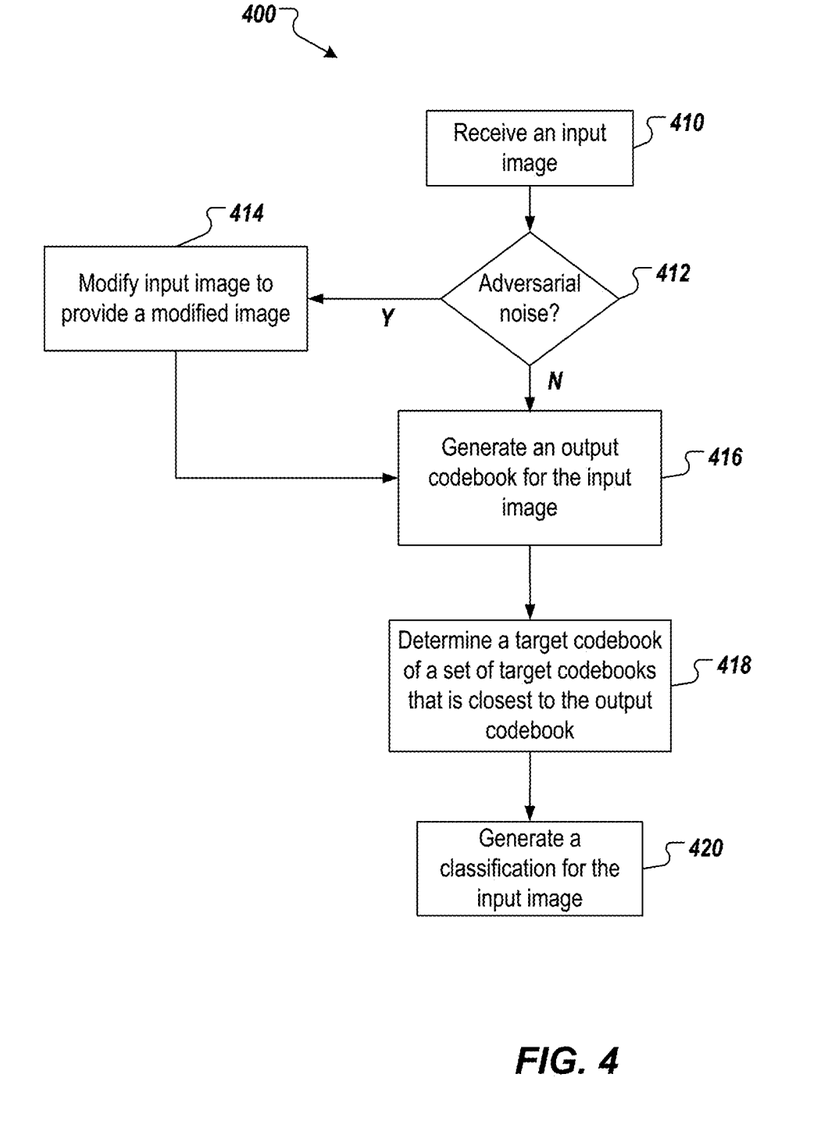

FIG. 4 depicts an example process 400 that can be executed in accordance with implementations of the present disclosure. In some examples, the example process 400 is provided using one or more computer-executable programs executed by one or more computing devices. For example, the example process 400 can be executed by an AAD platform of the present disclosure.

An input image is received (410). In some implementations, a user (e.g., user 218 of FIG. 2) submits an input image to the AAD platform for classification over a network (e.g., network 214 of FIG. 2) using a computing device (e.g., user device 216 of FIG. 2).

The input image is processed to detect the presence of any adversarial noise contained within the input image (412). A trained ML filtering model (e.g., the smoothing filter 210 of FIG. 2) processes the input image to detect and remove adversarial noise. In some implementations, the trained ML filtering model is a neural network. In some implementations, the trained ML filtering model is an autoencoder. In some implementations, the trained ML filtering model detects adversarial noise contained within the input image by applying ML learning techniques to the input image.

If adversarial noise is detected in the input image, the input image is modified to provide a modified image (414). In some implementations, the modified image is provided as a reconstruction of the input image with any detected adversarial noise removed. In some implementations, the modified image is provided by applying a series of transformations to the input image to reconstruct the input image without adversarial noise. In some implementations, the transformations applied to the input image to provide the modified image are non-linear transformations.

An output codebook is generated for the input image (416). In some implementations, the output codebook is generated by a trained ML classification model (e.g. the image classifier 212 of FIG. 2). In some examples, if adversarial noise is detected in the input image, the output codebook is generated by applying ML techniques to the modified image provided by the ML filtering model. In some implementations, the output codebook is generated for the input image based on a predicted classification for the input image determined by applying ML techniques to the modified image. In some examples, if no adversarial noise is detected in the input image, the output codebook for the input image is generated by applying ML techniques to the input image. In some implementations, the output codebook is generated for the input image based on a predicted classification for the input image determined by applying ML techniques to the input image. In some implementations, the output codebook is provided as a vector. In some implementations, the output codebook is provided as a vector of random value and dimension. In some implementations, the output codebook is provided as a vector of random value between −1 and 1. In some implementations, the output codebook is provided as a point in a Euclidean space of random dimension. In some implementations, the output codebook is provided as a vector with the same dimensions as the dimensions of a set of target vectors generated within the AAD platform based on a set of classification labels received by the AAD platform.

A target codebook of a set of target codebooks that is closest to the output codebook is determined (418). In some implementations, the set of target codebooks is generated based on a set of classification labels received by the AAD platform. In some implementations, the set of target codebooks is generated by applying a deterministic pattern to the set of classification labels, such that each target codebook of the set of target codebooks is deterministically related to a classification label of the set of classification labels. In some implementations, the target codebook of a set of target codebooks that is closest to the output codebook is determined by measuring the Euclidean distance between the output codebook and each target codebook of the set of target codebooks.

A classification for the input image is generated (420). In some implementations, the classification is generated by determining the classification label of a set of classification labels specific to the target codebook of the set of target codebooks that is the smallest Euclidean distance from the output codebook generated for the input image. In some implementations, the classification is provided to a user of the AAD platform (e.g., user 218 of FIG. 2) over a network (e.g., network 214 of FIG. 2).

Figure 5:
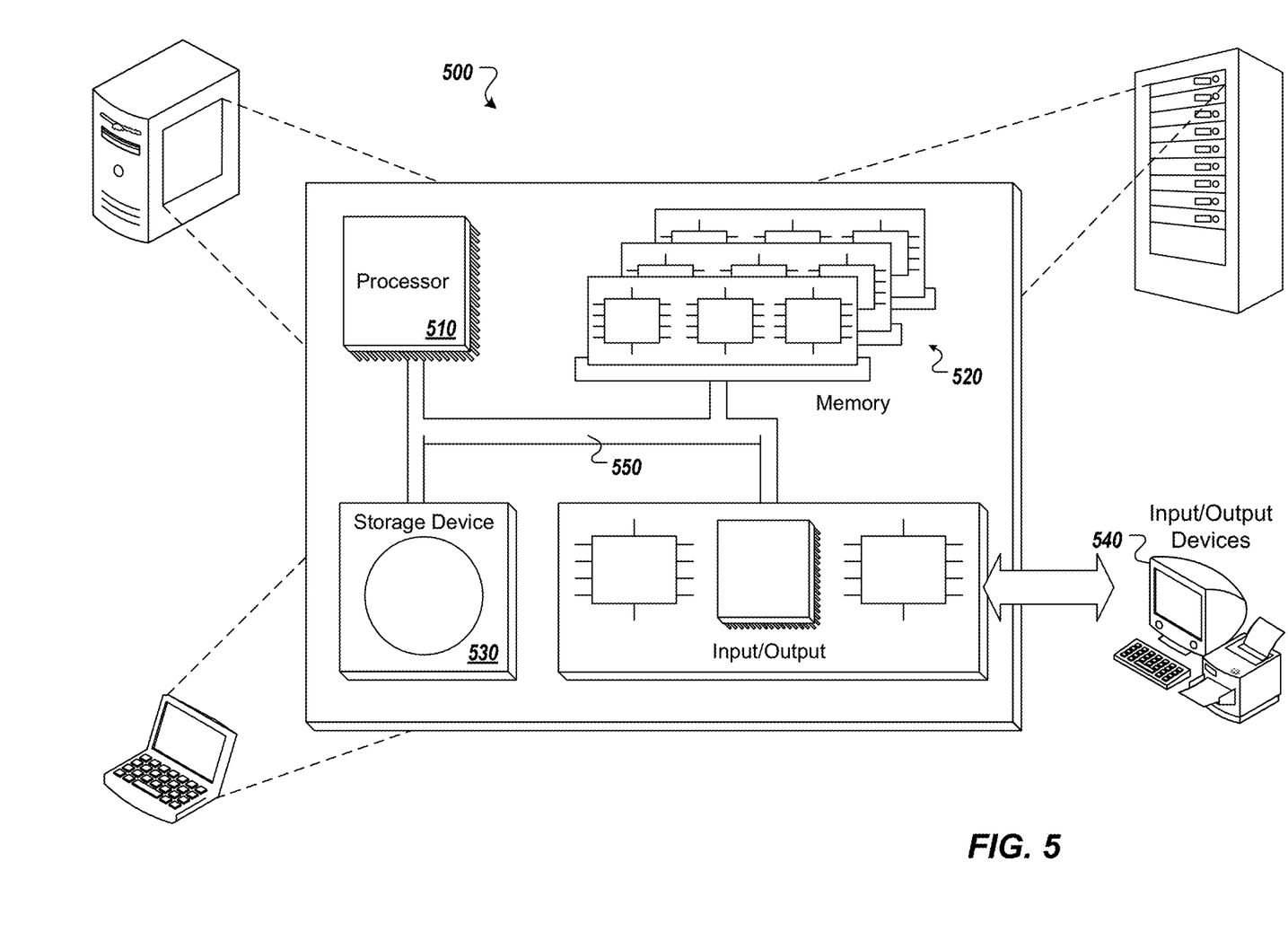
FIG. 5 is a schematic illustration of example computer systems that can be used to execute implementations of the present disclosure.

Referring now to FIG. 5, a schematic diagram of an example computing system 500 is provided. The system 500 can be used for the operations described in association with the implementations described herein. For example, the system 500 may be included in any or all of the server components discussed herein. The system 500 includes a processor 510, a memory 520, a storage device 530, and an input/output device 540. The components 510, 520, 530, 540 are interconnected using a system bus 550. The processor 510 is capable of processing instructions for execution within the system 500. In some implementations, the processor 510 is a single-threaded processor. In some implementations, the processor 510 is a multi-threaded processor. The processor 510 is capable of processing instructions stored in the memory 520 or on the storage device 530 to display graphical information for a user interface on the input/output device 540.

The memory 520 stores information within the system 500. In some implementations, the memory 520 is a computer-readable medium. In some implementations, the memory 520 is a volatile memory unit. In some implementations, the memory 520 is a non-volatile memory unit. The storage device 530 is capable of providing mass storage for the system 500. In some implementations, the storage device 530 is a computer-readable medium. In some implementations, the storage device 530 may be a floppy disk device, a hard disk device, an optical disk device, or a tape device. The input/output device 540 provides input/output operations for the system 500. In some implementations, the input/output device 540 includes a keyboard and/or pointing device. In some implementations, the input/output device 540 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for defending against adversarial attacks on image-based machine learning (ML) models, the method being executed by one or more processors and comprising:
receiving a set of training images and a set of classification labels, each training image in the set of training images being associated with one or more classification labels in the set of classification labels;
generating a set of target codebooks based on the set of classification labels, each target codebook in the set of target codebooks being specific to a classification label in the set of classification labels, the set of target codebooks being provided as a first set of vectors of random value and dimension;
generating a set of output codebooks based on the set of training images, each output codebook in the set of output codebooks being specific to a class of a set of classes, the set of output codebooks being provided as a second set of vectors of random value and dimension;
training a ML model by minimizing a loss function provided as a mean-squared-error (MSE) loss function, the loss function being measured by the Euclidean distance between an output codebook of the set of output codebooks and a target codebook of the set of target codebooks, the target codebook being specific to a classification label of the set of classification labels associated with the training image of the set of training images used to generate the output codebook of the set of output codebooks.

2. The method of claim 1, further comprising:
receiving an input image;
modifying the input image to provide a modified image, the modified image having less noise than the input image;
generating a first output codebook for the input image by processing the modified image using the trained ML model, the first output codebook being a vector of random value and dimension;
determining a target codebook of the set of target codebooks the smallest Euclidean distance from the first output codebook; and
generating a classification for the input image, the classification being a classification label of the set of classification labels specific to the target codebook of the set of target codebooks the smallest Euclidean distance from the first output codebook.

3. The method of claim 2, wherein modifying the input image comprises processing the input image using an autoencoder.

4. The method of claim 2, wherein modifying the input image comprises applying a series of non-linear transformations to the input image to reconstruct the input image without adversarial noise.

5. The method of claim 1, wherein the set of classification labels is provided as a set of binary vectors.

6. The method of claim 1, wherein generating a set of target codebooks comprises applying a deterministic pattern to the set of classification labels to generate the first set of vectors.

7. The method of claim 1, wherein the dimensions of the vectors of the second set of vectors are the same as the dimensions of the vectors of the first set of vectors.

8. A non-transitory computer-readable storage medium coupled to one or more processors and having instructions stored thereon which, when executed by the one or more processors, cause the one or more processors to perform operations for preventing adversarial attacks on image-based machine learning applications, the operations comprising:
receiving a set of training images and a set of classification labels, each training image in the set of training images being associated with one or more classification labels in the set of classification labels;
generating a set of target codebooks based on the set of classification labels, each target codebook in the set of target codebooks being specific to a classification label in the set of classification labels, the set of target codebooks being provided as a first set of vectors of random value and dimension;
generating a set of output codebooks based on the set of training images, each output codebook in the set of output codebooks being specific to a class of a set of classes, the set of output codebooks being provided as a second set of vectors of random value and dimension;
training a ML model by minimizing a loss function provided as a mean-squared-error (MSE) loss function, the loss function being measured by the Euclidean distance between an output codebook of the set of output codebooks and a target codebook of the set of target codebooks, the target codebook being specific to a classification label of the set of classification labels associated with the training image of the set of training images used to generate the output codebook of the set of output codebooks.

9. The computer-readable storage medium of claim 8, further comprising:

receiving an input image;

modifying the input image to provide a modified image, the modified image having less noise than the input image;

generating a first output codebook for the input image by processing the modified image using the trained ML model, the first output codebook being a vector of random value and dimension;

determining a target codebook of the set of target codebooks the smallest Euclidean distance from the first output codebook; and generating a classification for the input image, the classification being a classification label of the set of classification labels specific to the target codebook of the set of target codebooks the smallest Euclidean distance from the first output codebook.

10. The computer-readable storage medium of claim 9, wherein modifying the input image comprises processing the input image using an autoencoder.

11. The computer-readable storage medium of claim 9, wherein modifying the input image comprises applying a series of non-linear transformations to the input image to reconstruct the input image without adversarial noise.

12. The computer-readable storage medium of claim 8, wherein the set of classification labels is provided as a set of binary vectors.

13. The computer-readable storage medium of claim 8, wherein generating a set of target codebooks comprises applying a deterministic pattern to the set of classification labels to generate the first set of vectors.

14. The computer-readable storage medium of claim 8, wherein the dimensions of the vectors of the second set of vectors are the same as the dimensions of the vectors of the first set of vectors.

15. A system, comprising:
a computing device; and
a computer-readable storage device coupled to the computing device and having instructions stored thereon which, when executed by the computing device, cause the computing device to perform operations for preventing adversarial attacks on image-based machine learning applications, the operations comprising:
receiving a set of training images and a set of classification labels, each training image in the set of training images being associated with one or more classification labels in the set of classification labels;
generating a set of target codebooks based on the set of classification labels, each target codebook in the set of target codebooks being specific to a classification label in the set of classification labels, the set of target codebooks being provided as a first set of vectors of random value and dimension;

generating a set of output codebooks based on the set of training images, each output codebook in the set of output codebooks being specific to a class of a set of classes, the set of output codebooks being provided as a second set of vectors of random value and dimension;

training a ML model by minimizing a loss function provided as a mean-squared-error (MSE) loss function, the loss function being measured by the Euclidean distance between an output codebook of the set of output codebooks and a target codebook of the set of target codebooks, the target codebook being specific to a classification label of the set of classification labels associated with the training image of the set of training images used to generate the output codebook of the set of output codebooks.

16. The system of claim 15, further comprising:
receiving an input image;
modifying the input image to provide a modified image, the modified image having less noise than the input image;

generating a first output codebook for the input image by processing the modified image using the trained ML model, the first output codebook being a vector of random value and dimension;

determining a target codebook of the set of target codebooks the smallest Euclidean distance from the first output codebook; and generating a classification for the input image, the classification being a classification label of the set of classification labels specific to the target codebook of the set of target codebooks the smallest Euclidean distance from the first output codebook.

17. The system of claim 16, wherein modifying the input image comprises processing the input image using an autoencoder.

18. The system of claim 16, wherein modifying the input image comprises applying a series of non-linear transformations to the input image to reconstruct the input image without adversarial noise.

19. The system of claim 15, wherein the set of classification labels is provided as a set of binary vectors.

20. The system of claim 15, wherein generating a set of target codebooks comprises applying a deterministic pattern to the set of classification labels to generate the first set of vectors.

* * * * *